(12) United States Patent
Terrazas Gonzalez et al.

(10) Patent No.: US 11,388,187 B2
(45) Date of Patent: Jul. 12, 2022

(54) METHOD OF DIGITAL SIGNAL FEATURE EXTRACTION COMPRISING MULTISCALE ANALYSIS

(71) Applicant: UNIVERSITY OF MANITOBA, Winnipeg (CA)

(72) Inventors: Jesus David Terrazas Gonzalez, Winnipeg (CA); Witold Kinsner, Winnipeg (CA)

(73) Assignee: University of Manitoba, Winnipeg (CA)

( * ) Notice: Subject to any disclaimer, the term of this patent is extended or adjusted under 35 U.S.C. 154(b) by 103 days.

(21) Appl. No.: 17/059,308

(22) PCT Filed: May 31, 2019

(86) PCT No.: PCT/CA2019/050753
§ 371 (c)(1),
(2) Date: Nov. 27, 2020

(87) PCT Pub. No.: WO2019/227227
PCT Pub. Date: Dec. 5, 2019

(65) Prior Publication Data
US 2021/0144171 A1    May 13, 2021

Related U.S. Application Data

(60) Provisional application No. 62/678,649, filed on May 31, 2018.

(51) Int. Cl.
*H04L 9/40* (2022.01)
*G06F 21/56* (2013.01)

(52) U.S. Cl.
CPC ...... *H04L 63/1458* (2013.01); *H04L 63/1416* (2013.01); *G06F 21/562* (2013.01); *H04L 63/1425* (2013.01)

(58) Field of Classification Search
CPC ... H04L 9/40; H04L 63/1458; H04L 63/1416; H04L 63/1425; G06F 21/56; G06F 21/562
See application file for complete search history.

(56) References Cited

U.S. PATENT DOCUMENTS

| | | | |
|---|---|---|---|
| 8,452,101 B2 * | 5/2013 | Nakamura | G06V 20/588 382/190 |
| 2010/0200660 A1 * | 8/2010 | Moed | G06K 7/14 235/470 |
| 2020/0077892 A1 * | 3/2020 | Tran | G16H 40/67 |

* cited by examiner

*Primary Examiner* — Jayesh M Jhaveri
(74) *Attorney, Agent, or Firm* — Christopher J. Dynowski; Ryan W. Dupuis; Ade & Company Inc.

(57) ABSTRACT

A method of digital signal feature extraction comprises steps of: (a) segmenting samples of the digital signal to form a set of groupings each comprising a subset of the samples, with each grouping having endpoints spaced apart by a current grouping size; (b) applying an operator, which is associated with the desired feature to be extracted, to the subset of the samples of each grouping to derive a representative value therefor corresponding to the grouping size; and (c) repeating step a), but based on a different grouping size, and repeating step b) on the set of groupings formed based on the different grouping size, with the operator being adapted to correspond to the different grouping size. The set of groupings formed in step a) collectively includes all of the samples of the signal. One endpoint of at least one grouping is intermediate the endpoints of another one of the groupings.

8 Claims, 5 Drawing Sheets

METHOD OF DIGITAL SIGNAL FEATURE EXTRACTION COMPRISING MULTISCALE ANALYSIS

This application is a national phase filing of PCT/CA2019/050753 and claims the benefit of U.S. Provisional application Ser. No. 62/678,649 filed May 31, 2018.

FIELD OF THE INVENTION

The present invention relates generally to feature extraction performed on a digital signal, and more particularly to such a method of feature extraction comprising multiscale analysis.

BACKGROUND

A plethora of data is present in computer systems representing a wide variety of items, and it is becoming increasingly desirable to process this data in such a way as to collect information about same. The information collected about this data, for example specific characteristics of a digital signal such as its skewness, may indicate or be used to identify certain characteristics about the source of the data. In one example, Internet traffic can be analyzed to identify anomalous behaviour which may be indicative of a cyber-attack, such as a distributed denial of service type of attack.

However, due to the shear amount of data available, traditionally there is a compromise between an amount of information which can be collected about the data and the speed with which this information collection can be performed, as well as the amount of information which is generated thereby as this is often stored on a computer memory of limited capacity. It is desirable to obtain as much information about the data as possible, while performing this collection quickly and obtaining results which do not occupy an excessive amount of memory.

SUMMARY OF THE INVENTION

According to an aspect of the invention there is provided a method of feature extraction from a digital signal comprising:

a) segmenting a plurality of samples of the digital signal to form a set of groupings each comprising a subset of the samples;

wherein the set of groupings collectively includes all of the samples;

wherein endpoints of each one of the groupings are spaced apart by a grouping size;

wherein one of the endpoints of at least one of the groupings is intermediate the endpoints of another one of the groupings of the samples;

b) applying a first operator, which is associated with a desired feature to be extracted, to the subset of the samples of each one of the groupings to derive a representative value therefor corresponding to the grouping size;

the first operator being adapted to correspond to the grouping size;

c) repeating step a) based on a different grouping size, and repeating step b) on the set of groupings formed based on the different grouping size, with the first operator being adapted to correspond to the different grouping size.

Thus a single feature-representative value can be derived from the samples of the digital signal that are under consideration, and no individual sample is omitted in deriving the value. As such, all information (represented by the samples) is considered in feature extraction and may be compressed into a single representative value.

In an arrangement, the subset of the samples in each one of the groupings consists of the endpoints of the respective one of the groupings.

In an arrangement, the grouping size is larger than the different grouping size of step c).

In an arrangement, the grouping size and the different grouping size of step c) are related by a prescribed factor.

The method may further comprise applying a second operator to the representative values formed using the first operator for the groupings of a common grouping size so as to derive a compacted representative value, which is associated with the desired feature to be extracted, for the common grouping size.

The method may further comprise applying a third operator to the representative values formed using the second operator for each common grouping size so as to derive a further compacted representative value, which is associated with the desired feature to be extracted, for the samples.

In an arrangement, the method may further comprise repeating step c) until each one of the set of groupings shares a common endpoint with at least one other one of the groupings. In other words, step c) is repeated until all groupings are adjacent.

In an arrangement, the first operator is applied to each subset of the groupings which is adjacent.

According to another aspect of the invention there is provided a method for feature extraction of a plurality of samples available in a computer system. The method comprises a framing process for segmenting a selected set of samples from the digital signal by a prescribed factor. From the original samples present in the frames, subsequent sets, defined by volume elements (vels), are derived. The vels consider samples lacking adjacency or that are separated by a prescribed distance in the original signal. The separation distance between samples is defined by the vel size and it is set by a prescribed factor. Complementary vel sets are derived starting at each of the samples present in a non-adjacency in order to collectively aggregate the contributions of all samples. The method also includes a step of applying an operator, which is intended to perform the feature extraction at the distance or scale defined by the vel size utilized, to the set of samples derived by the vel size in the frame under analysis. The mathematical operator derives a representative and compact value corresponding to the set of samples. If the set of samples in the current frame is non-continuous, the method further includes substantially repeating steps a) and b) on the current frame to form distinct subsequent sets of samples by using a distinct vel size and further applying a mathematical operator, and substantially repeating step c) on the current frame until the sets of samples become adjacent. The subsequent sets of samples collectively includes all of the samples originally present in the current frame.

BRIEF DESCRIPTION OF THE DRAWINGS

The invention will now be described in conjunction with the accompanying drawings in which:

FIG. 2A shows a first portion of the example and FIG. 2B a second portion thereof;

In the drawings like characters of reference indicate corresponding parts in the different figures.

DETAILED DESCRIPTION

Figure 1:
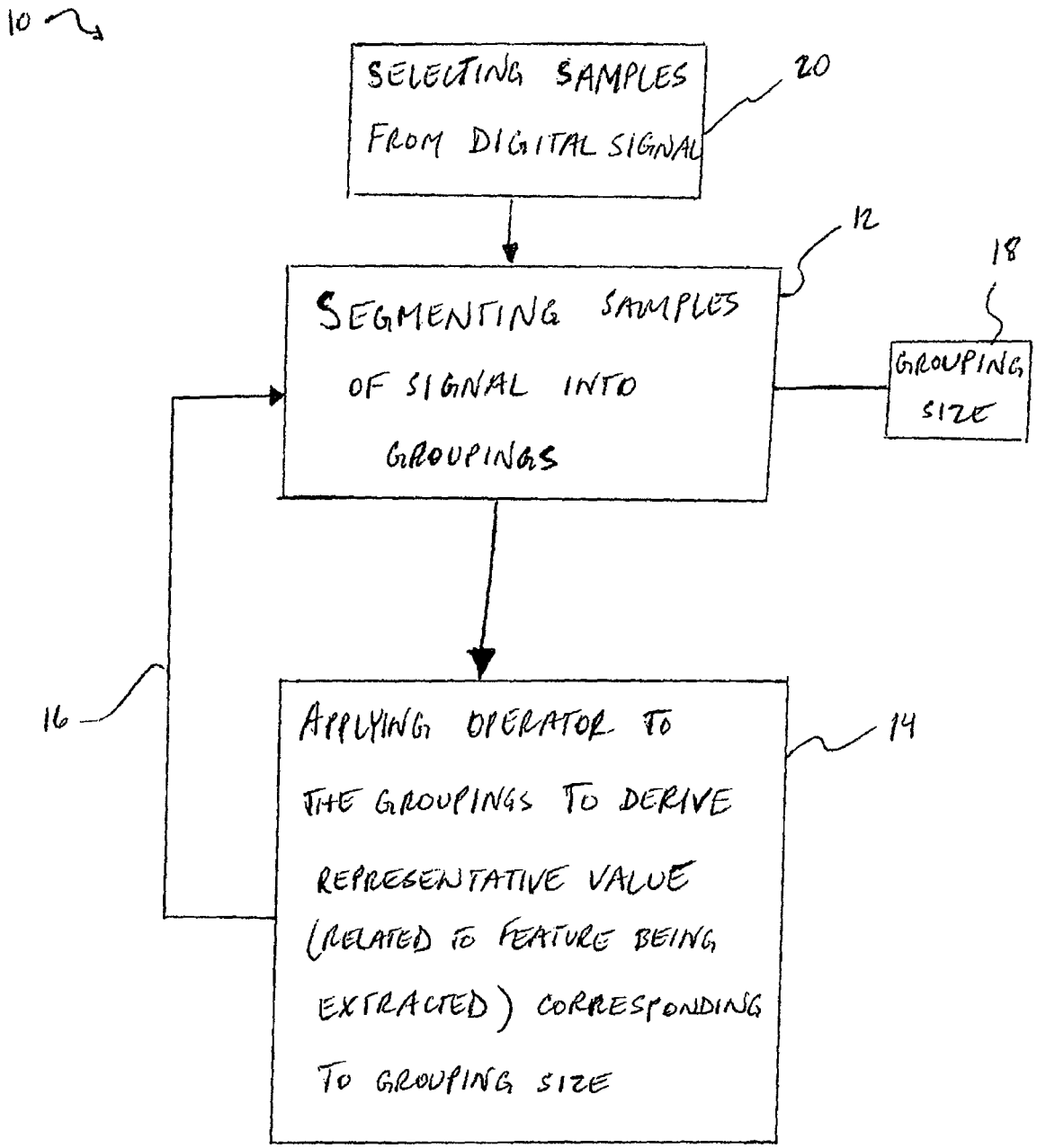
FIG. 1 is a flowchart according to one arrangement of method according to the present invention.

The accompanying figures illustrate a method of digital signal feature extraction generally indicated at 10 in FIG. 1 to be performed on a digital signal, such as that in a computer system. Feature extraction refers to a process of analyzing the digital signal to qualify same based on a desired feature which is to be extracted. Typically, the desired feature is indicative of some characteristic of the signal. One example of desired feature which can be extracted from the digital signal is its skewness, which is indicative of the asymmetry of either a probability distribution function (pdf) or a probability mass function (pmf). This asymmetry reveals to which side of the pdf/pmf the population is biased. The method 10 is multiscale in nature meaning that trends in the desired feature for a common set of samples are analyzed iteratively and using a differently sized subset of the samples at each scale to identify the trends, which may otherwise be unidentifiable or non-existent if analyzed at only one scale.

Referring to FIG. 1, the method 10 generally comprises the following steps:

a) segmenting a plurality of samples of the digital signal to form a set of groupings each comprising a subset of the samples, as indicated at box 12;

b) applying an operator, which is associated with the desired feature to be extracted, to the subset of the samples of each grouping to derive a representative value therefor corresponding to the grouping size, as indicated at box 14; and c) as indicated by arrow 16, repeating step a), but based on a different grouping size (the relationship between grouping size and step a) being generally indicated at box 18), and repeating step b) on the set of groupings formed based on the different grouping size, with the operator being adapted to correspond to the different grouping size.

Typically, the entity performing steps a) through c) above also initially performs a step of selecting samples from the digital signal, from which samples the groupings are subsequently created in step a) above, and thus the method 10 may include a sampling step as illustrated at 20 in FIG. 1.

"Sample" refers to a single discrete datum from the digital signal. The term "frame" may be used herein to refer to the set of samples selected from the digital signal that are used in the subsequent processing of the method 10. Typically, the samples of the frame are consecutive in time.

Turning now in more detail to the method 10 as shown in FIG. 1, the set of groupings which is formed in step a) above collectively includes all of the samples of the signal. Thus, no individual sample is omitted in deriving the representative value, or, in other words, all information represented by the sample set or frame is considered. Furthermore, each grouping is formed by selecting a specific initial individual sample in the frame, to define a first endpoint of the grouping, and then selecting a second endpoint spaced from the first endpoint by the grouping size 18. Thus, the endpoints of each grouping are spaced apart by the grouping size 18. It will be appreciated that the grouping size is no larger than an amount of the samples, that is, a number of the samples forming the frame. At least one other grouping is formed by selecting a first endpoint that is intermediate the endpoints of another one of the groupings. As such, the groupings of the method 10 in step a) 12 are not simply arranged end to end (including where two groupings share a common sample as an endpoint of each of the two groupings) but, rather, at least two groupings overlap. This allows for a better analysis of trends in the frame that pertain to the desired feature, which may otherwise be missed where only groupings disposed end-to-end, that is, groupings which are adjacent, are considered.

In regard to step b) above at 14, in each iteration thereof the operator which is applied is adapted to correspond to the grouping size. That is, the operator applied at step b) is of the same nature so as to derive the appropriate value corresponding to the desired feature to be extracted, but for proper application of the operator it is modified or adjusted based on the current grouping size of the groupings being analyzed.

Thus, in each iteration of steps a) and b) a common grouping size is used, but according to the multiscale nature the grouping sized is varied from one iteration of the combination of steps a) and b) to the next.

Figure 2A:
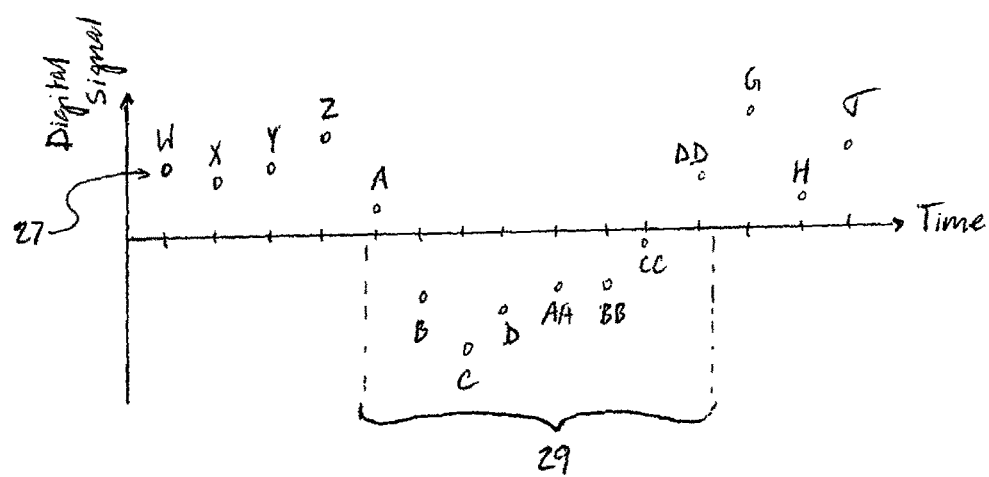
FIGS. 2A and 2B collectively illustrate an example in which the arrangement of the present invention of FIG. 1 is applied to a digital signal, where
Figure 2A:
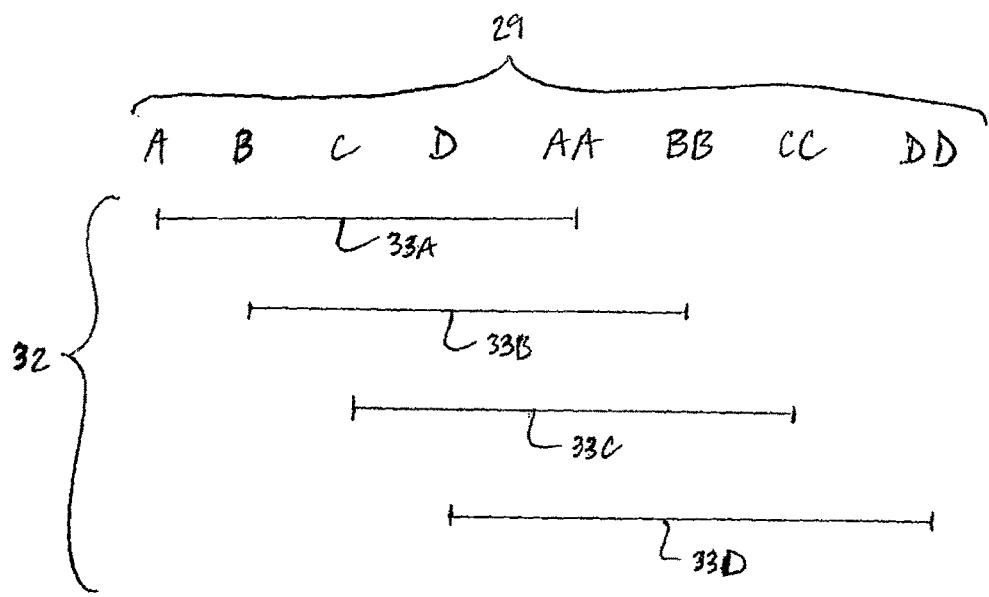
Figure 2A:
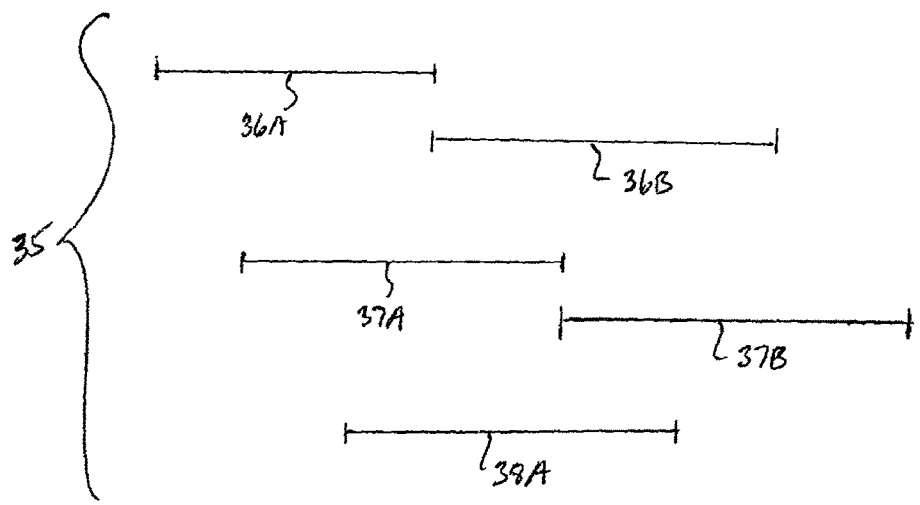
Figure 2B:
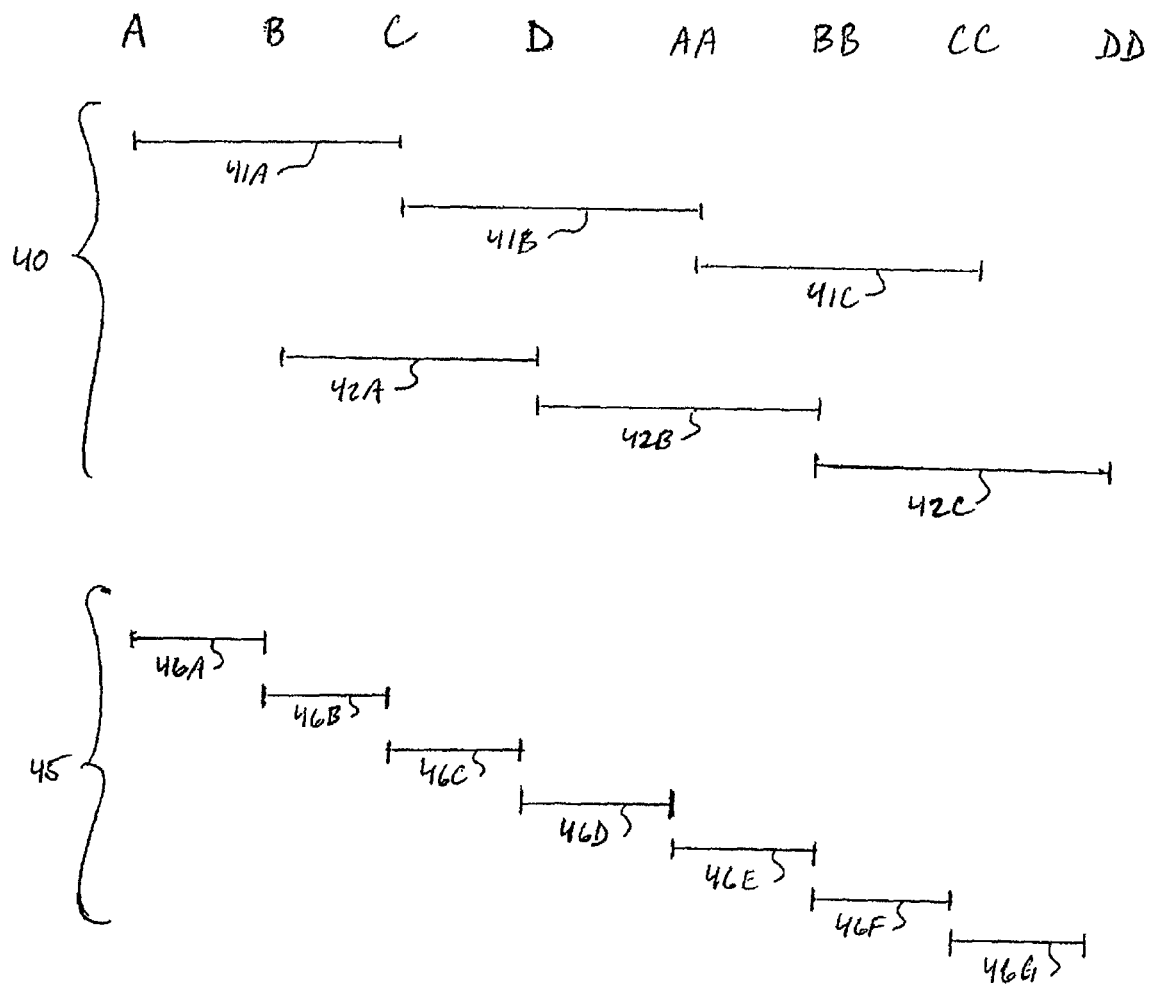

FIGS. 2A and 2B provide an illustrative example of the method 10 applied to a digital signal, a portion of which is illustrated in a graph 24. Graph 24 shows an example digital signal 27 comprising data indicated by discrete points such as W, X and Y on graph 24. In this example, points A, B, C, D, AA, BB, CC and DD are selected as the samples on which feature extraction is to be performed, and thus these points forming a portion of the signal 27 collectively form the processing frame indicated at 29 upon which steps a) through c) of the method 10 will be applied. It will be appreciated that although the frame includes eight samples in the example of FIGS. 2A and 2B, different amounts of samples can be processed in other arrangements of the method 10.

In the first iteration of step a) indicated at 32, the samples of frame 29 are segmented or divided into groupings based on a grouping size of four. This is simply one possible grouping size at which the method may commence. As such, based on the amount of samples in the frame 29, which is eight, and based on the grouping size of four, four groupings are formed including a first grouping 33A comprising endpoints A and AA, a second grouping 33B comprising endpoints B and BB, a third grouping 33C comprising endpoints C and CC and a fourth grouping 33D comprising endpoints D and DD. Each of the groupings 33A-33D includes a subset of the samples of the frame 29, and collectively all samples are encompassed by the groupings 33A-33D.

In the illustrated arrangement, the subset of the samples in each grouping such as 33A-33D consists of the endpoints of the respective grouping. That is, in the illustrated arrangement the first grouping 33A consists only of points A and AA, the second grouping 33B consists of points B and BB, the third grouping 33O consists of points C and CC and the fourth grouping 33D consists of points D and DD. This is sufficient for the feature extraction; however, in other arrangements, the groupings formed in step a) may include intermediary samples which are disposed between the endpoints, for example if it is believed that suitable information with respect to the desired feature to be extracted may not be derived from the endpoints of groupings alone.

It will be appreciated that since the groupings of the illustrated arrangement each consist of only their endpoints, in the illustrated arrangement there is a unique set of groupings for a respective grouping size (as the set of groupings collectively includes all of the samples). However, in other arrangements in which the subset of samples in each grouping includes more than just its endpoints, there may be a different set of groupings formed in a single iteration of step a) depending on how the groupings are formed, including for example a starting point for forming a first grouping and a stop criterion determining when formation of the groupings ceases.

Once the groupings 33A-33D are formed, step b) of the method indicated at 14 is carried out or performed by applying the operator corresponding to the feature to be extracted, which is adapted to correspond to the current grouping size of four, to each adjacent subset of the groupings, that is, a subset of the groupings including pairs of the groupings sharing a common sample as an endpoint. In this case, due to the grouping size of four, there are no adjacent groupings, such that the operator is applied to each grouping individually. In other words, any adjacent subset of the groupings comprises only one grouping, and the operator is applied to same.

Thus, application of the operator derives a feature-representative value quantifying the desired feature in respect of that portion of the digital signal 27 represented by the subset of samples of each grouping for the particular grouping size of the set of groupings, which in the first iteration 32 of step a) is four.

A second operator, which is different than the first operator applied to the adjacent subsets of groupings, may be applied to the representative values formed using the first operator for the groupings of a common grouping size so as to derive a compacted representative value, which is associated with the desired feature to be extracted, for the common grouping size. For example, the second operator may be an average operator which determines an average value of the representative values of the adjacent subsets of the groupings, so as to derive a single feature-representative value corresponding to the particular grouping size and to that frame.

Typically, the feature-representative value(s) is stored so as to be accessible at a later time, for example for reference or further processing.

This therefore concludes the processing of the samples of the frame 29 at the scale or grouping size of four, and steps a) and b) are repeated for at least one more (different) scale or grouping size.

As such, a second iteration of step a) is performed, indicated at 35, based on the different grouping size of three. Thus are formed five groupings including a first scale-specific grouping 36A comprising endpoints A and D, a second grouping 36B comprising endpoints D and CC, a third grouping 37A comprising endpoints B and AA, a fourth grouping 37B comprising endpoints AA and DD and a fifth grouping 38A comprising endpoints C and BB. In the case of a grouping size which is sized sufficiently small such that adjacent groupings can be formed, as for example groupings 36A and 36B, the segmenting in step a) first forms all possible adjacent groupings which will fit (depending on the grouping size and the amount of samples in the frame), such as groupings 36A and 36B, prior to translating or shifting the starting point to form any remaining unique groupings such as groupings 37A and 37B. This affects the order of applying the operator in step b) 14, as typically the operator is applied to sets of adjacent groupings to derive a representative value corresponding to the desired feature before a second and different operator is applied to those intermediary representative values to derive a single value for that scale. In this case, due to the grouping size of three, each adjacent set of groupings comprises at most two groupings.

Step b) of the method indicated at 14 for the second iteration thus includes applying the first operator to each subset of the groupings which is adjacent, and therefore the first operator is applied respectively to the pair of groupings 36A and 36B, the pair of groupings 37A and 37B, and to the grouping 38A. A second operator may then be applied to derive from these three values a single averaged value for the grouping size of three.

In the presently illustrated example, two more iterations of steps a) and b) are performed as illustrated by FIG. 2B. However, after at least two iterations a third operator may be applied to the representative values formed using the second operator for each common grouping size so as to derive a further compacted representative value, which is associated with the desired feature to be extracted, for the samples. For example, the third operator may be an average operator which determines an average value of the representative values of the different grouping sizes, so as to derive a single feature-representative value corresponding to the whole frame. As such, if no further iterations of steps a) and b) would be deemed desirable or necessary, the third operator may be applied to the representative values derived from applying the second operator to each common grouping size to derive a single value for the desired feature to be extracted that is representative of the whole frame 29.

A third iteration of the method 10 includes a third iteration of step a) indicated at 40 that is based on the grouping size of two. Thus is formed a first adjacent set of groupings comprising the subset of groupings 41A, 41B and 41C where first grouping 41A comprises endpoints A and C, second grouping 41B comprises endpoints C and AA and third grouping 41C comprises endpoints AA and CC. There is also formed a second adjacent set of groupings comprising the subset of groupings 42A-42C where a fourth overall grouping 42A comprises endpoints B and D, a fifth grouping 42B comprises endpoints D and BB and a sixth grouping 42C comprises endpoints BB and DD. The first operator is applied to the first adjacent set of groupings 41A-41C and to the second adjacent set of groupings 42A-42C. The second operator may be applied upon those representative values formed using the first operator to derive a compacted representative value for the common grouping size of two.

As is evident from a comparison of the first three iterations illustrated by steps a) indicated at 32, 35 and 40, the grouping sizes are related by a prescribed factor. In the presently illustrated case, the prescribed factor is a subtractive difference of one. As such, each subsequent iteration involves a different grouping size which is equal to one subtracted from the current grouping size (in other words, the current grouping size minus one). In other arrangements which are not illustrated herein, the prescribed factor may be for example a multiplicative factor of two where the first iteration is based on a grouping size of four, the second iteration is based on a grouping size of two and the third iteration is based on a grouping size of one. Thus, generally speaking, each of the first, second and third operators are distinct.

Additionally, as is shown by the first three collective iterations of steps a) and b), the method 10 of the illustrated arrangement commences with a larger grouping size and each subsequent iteration is based on a smaller grouping size. In other arrangements which are not shown, the method 10 may commence at a smaller grouping size and each subsequent iteration is based on a larger grouping size.

A fourth iteration of the method 10, or in other words a third iteration of step c) 16, comprises a fourth iteration of step a) indicated at 45 which forms groupings based on a grouping size of one. Thus is formed one adjacent set of groupings comprising a first grouping 46A including endpoints A and B, a second grouping 46B comprising endpoints B and C, a third grouping 46C comprising endpoints C and D, a fourth grouping 46D comprising endpoints D and AA, a fifth grouping 46E comprising endpoints AA and BB, a sixth grouping 46F comprising endpoints BB and CC and a seventh grouping 46G comprising endpoints CC and DD. Thus, all the groupings 46A-46G are adjacent. As such, the first operator is applied to the whole set of groupings to derive a single representative value, corresponding to the feature to be extracted, for the common grouping size of one.

In the presently illustrated example, the method 10 is iterated, or in other words step c) 16 is repeated, until each one of the set of groupings shares a common endpoint with at least one other one of the groupings. That is, step c) is repeated until all groupings are adjacent. This is in part due to commencing the method at an initial grouping size greater than one and iterating the method with progressively smaller grouping sizes. In other arrangements, the first iteration of steps a) and b) may be with a grouping size of one such that a different condition for determining when to stop iterating the method 10 is used.

The third operator may be applied to the representative values derived for the grouping sizes of four, three, two and one to derive a single compacted representative value for the whole frame 29.

Figure 3:
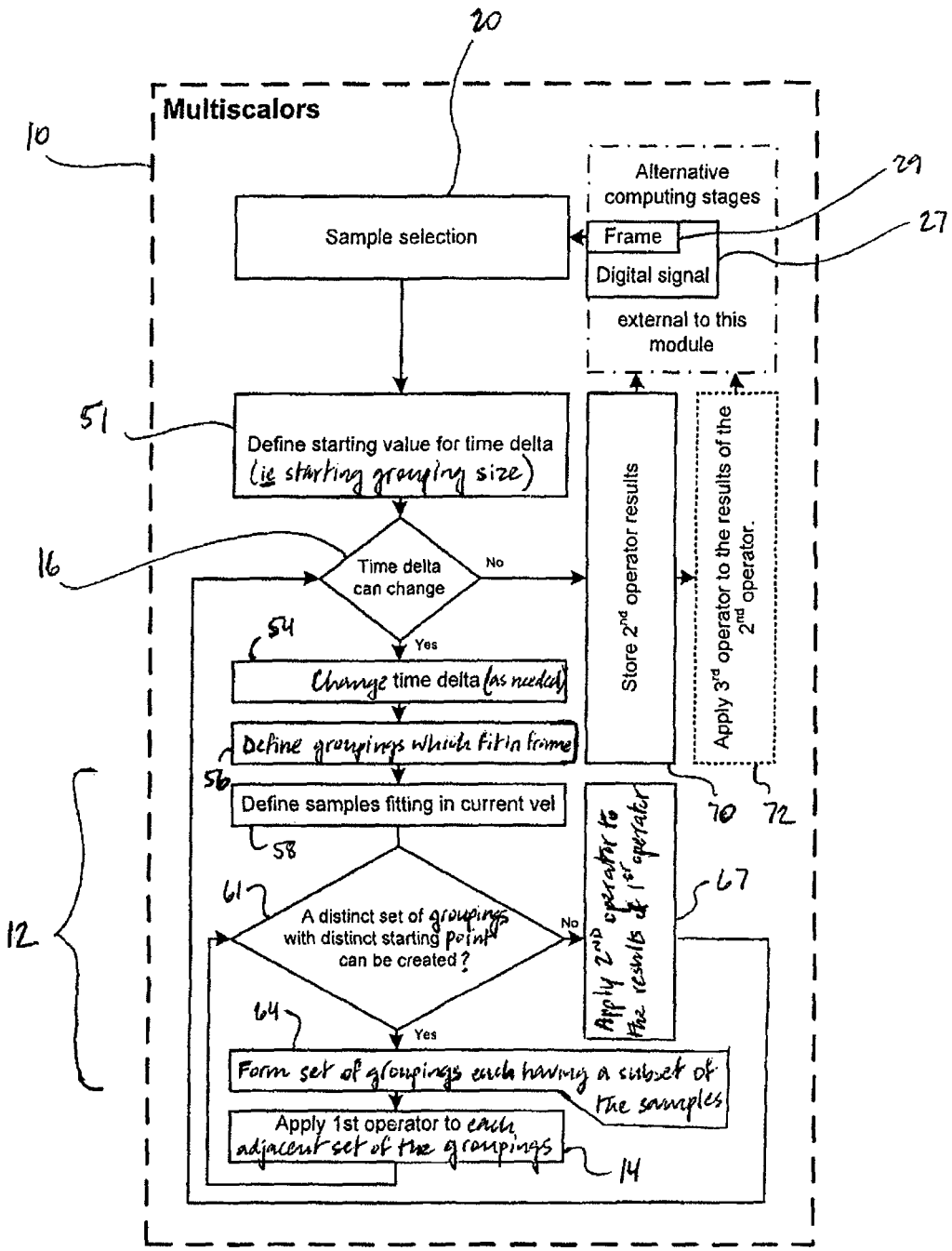
FIG. 3 is a flowchart which shows the arrangement of method of FIG. 1 in further detail.

FIG. 3 illustrates in further detail the steps of the method 10, which is termed "Multiscalors" for convenient reference, as it is described in connection with the example of FIGS. 2A and 2B. A frame 29 of the digital signal 27 acts as input to the sample selection step 20. It will be appreciated that in a case of real-time signal processing, the processing frame 29 is not static in time, but rather the frame 29 is dynamic. Thus the frame 29 defines a prescribed time interval or window within which the samples eventually operated upon by the method 10 can be found. Thus, if the frame is regarded as a dynamic time window superposed upon a continuous time digital signal, as instantaneous time endpoints of the frame 29 continually move in real-time, certain time-consecutive members of the signal 27 which fall within the frame 29 at a given instant are selected for subsequent analysis in the sample selection step 20. After this step, an initial grouping size at which the method 10 will commence is selected at 51, where the expression "time delta" refers to "grouping size" as will be seen in the example of analysis of skewness to follow shortly. Selection of a prescribed starting grouping size at 51 may be based on a number of factors such as considering enough samples to be computed that meet statistical significance requirements. After step 51 the method 10 enters a conditional loop which repeats if the grouping size 18 can be modified, which is re-evaluated after a first iteration of the conditional loop. Evaluation of this condition is effectively step c) of the method that is indicated at 16 in FIG. 1. Thus, a first step within the conditional loop is to modify the grouping size if the method 10 is entering a subsequent iteration, i.e. a second or later iteration, indicated at 54. Next, it is determined at 56 what possible groupings, based on the current grouping size, can fit in the processing frame 29, and, at 58, which respective ones of the selected samples are encompassed within each grouping defined at 56. A nested loop follows 58, which is evaluated at condition 61, and which may re-iterate in an arrangement where multiple different sets of groupings can be formed for a common grouping size (for example, depending on which respective samples form the subset of samples of each grouping, particularly where the subset of samples does not consist of only the grouping endpoints). For every iteration of the nested loop, a first step thereof at 64 is to form a set of groupings each having a prescribed subset of the samples such that the set of groupings collectively includes all the samples of the frame 29. A second step of the nested loop corresponds to step b) of the method 10 that is indicated at 14, at which the first operator is applied to each adjacent set of the groupings formed at 64. As such, steps 58, 61 and 64 of FIG. 3 collectively define step a) of the method 10 that is indicated at 12. Thus, in some arrangements of the method of the present invention there may be multiple iterations of steps a) and b) above of the method 10, collectively, for a single grouping size if depending on the criteria defining the groupings and which subsets of the sample each grouping includes, multiple distinct groupings can be formed for a common grouping size. Once the representative value has been calculated (using the first operator) for all possible or the desired number of different groupings which can be formed for a common grouping size, the second operator is applied to the results of the first operator to form a compacted representative value for the common grouping size at 67. After 67, the method 10 returns to the evaluation of the condition 16 where it is determined whether analysis of the samples of the frame 29 is to be performed at a different grouping size. If analysis of the frame samples has been performed for only one grouping size, then the loop following condition 61 is iterated again. Once it is determined that analysis at all desired grouping sizes is completed, the method typically includes as indicated at 70 a step of storing the results of the second operator that are representative of each grouping size for a common set of samples of the frame 29 of the digital signal 27. The second operator values may optionally be operated upon by the third operator at 72 to derive a single representative value for the samples of the frame 29 that encompasses the information at all grouping sizes which have been analyzed therefor, and the single representative value corresponding to the third operator may also be stored.

Figure 4:
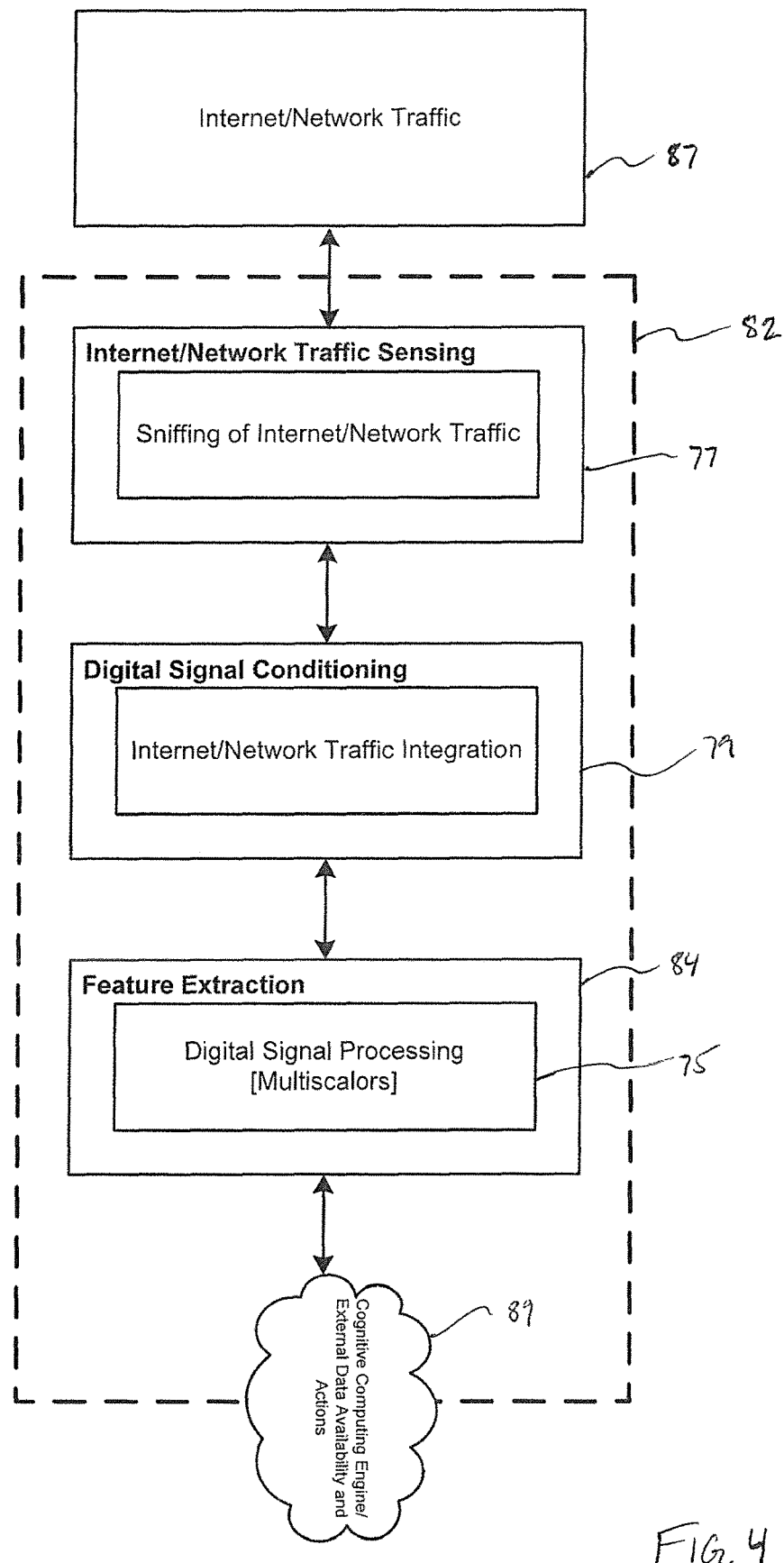
FIG. 4 is a schematic diagram of a computer module implementing the arrangement of method of FIG. 1.

Referring to FIG. 4, the "multiscalors" method 10 may be implemented in a single hardware/software module 75 which is communicated with other modules such as 77 or 79 of a processing system 82, which system employs feature extraction as one component 84 of its structure to analyze a source signal or data. Thus, as illustrated in FIG. 3, the values related to the desired feature which has been extracted and representing each grouping size analyzed (second operator results) and optionally all samples of the frame 29 (third operator result) may be output to modules of the processing system 82 that are external to the feature extraction module 84. In the example of a cybersecurity engine which analyzes Internet or network traffic 87 as an input, such a processing system 82 may include a sensing module 77 for collecting samples or sniffing the internet/network traffic, and a conditioning module 79 for processing the input signal in a manner which is more suitable for signal processing. Thus, a cleaned version of the digital signal may form the input of the method 10. The output of the "multiscalors" method 10 may be fed to another module or set of modules 89 of the processing system 82, based on which the system 82 may ascertain occurrence of a cyberattack and take appropriate defensive actions which interact with an external environment of the system 82.

The method 10 is implementable on a computer having a processor configured for executing instructions stored on a non-transient readable medium or memory, which instructions are configured to perform the steps of the method 10.

Characterization of signals, in a given time frame, is provided by moments like the mean, variance, or skewness in monoscale analysis.

Further with respect to the example of skewness, the generalized multiscale analysis methodology 10 described herein for arbitrary operators comprises deriving a sequence with multiscale nature from the signal B(t), such a sequence is provided by equation (1)

$$(\Delta B)_j = B(jn_k) - B((j-1)n_k) \text{ for } j=1, \ldots, N_k \quad (1)$$

and an arbitrary operator is utilized on it for each value of j. Hence, this multiscale analysis methodology is defined by the following operator $$\Xi_{\|}[\cdot] \quad (2)$$

where $\Xi$ represents an arbitrary operator, $\|$ is a short hand notation indicating that such operator is utilized for multiscale analysis, $\lfloor$ represents the samples or their relationships (e.g., $\Delta B$ that represents the amplitude differences of the signal B(t) over the time increment $\Delta t$) from the operating frame. The term "multiscalor" is used for convenient reference to $\|$.

Equation (2) stands for a simplification of (1) below $$\text{var}[B(t_2) - B(t_1)] \square |t_2 - t_1|^{2H} \quad (3)$$

and provides a generalization for utilizing arbitrary operators in multiscale analysis. The mathematical operators that restrict (3) have been removed in order to create a sequence resembling the activity in a multiscale analysis scenario for a given signal. The operators that have been removed are the variance and the Hurst exponent H. Hence, this generalization provides results based on raw data inherently extracted from multiscale analysis rather than providing explicit links to power laws and fractal dimensions. Nevertheless, the process for creating b-adic sequences, for the signal under analysis, is maintained intact. It is precisely this mechanism what allows access to the long-range dependencies that may be present in a signal. The availability of such a raw multiscale sequence allows the utilization of any arbitrary operator (conventionally restricted for monoscale analysis) for multiscale analysis.

The quantities used in the b-adic process for the creation of the multiscale signal are $K_{hi}$, $K_{max}$, $K_{buf}$, and $K_{low}$. A similar loop involved in computation of like quantities has been previously used in computation of variance and variance fractal dimension trajectory. Since all the mathematical restrictions have been removed in the instant methodology, the variance can be replaced with any arbitrary operator, or even further a combination of them.

Skewness is the third statistical moment that characterizes a probability mass function (pmf). Intuition about the information provided by skewness can be developed: (i) It is zero for symmetric distributions, (ii) when it is positive, its main mode is positioned to the left and usually a long tail is positioned to the right, and (iii) when it is negative, its main mode is positioned to the right and usually a long tail is positioned to the left. For the last two cases, it should be noted that the more negative/positive the skewness is an indication that such pmf differs significantly from a Gaussian and its process has no resemblance with a symmetric population.

Skewness has been used inherently in monoscale analysis, but herein it is applied in multiscale analysis as a multiscalor. This skewness multiscalor is defined by $$m_{3\|}[\cdot] \quad (4)$$

where $m_3$ represents skewness. Skewness is further defined by $$m_3 = E\left[\left(\frac{\Delta B - \mu}{\sigma}\right)^3\right] = \frac{E(\Delta B - \mu)^3}{\sigma^3} \quad (5)$$

where E is the expectation operator, $\Delta B$ has been previously defined, $\mu$ is the mean, and $\sigma$ is the standard deviation. This research differentiates the signal under analysis by utilizing $\Delta B$. Hence, the skewness multiscalor is defined as $$m_{3\|}\lfloor (\Delta B)_j \rfloor \quad (6)$$

This generalized multiscale analysis methodology can be ported in the solution of engineering problems related to cybersecurity signal processing. This is relevant to strengthening cyberspace against cyberattacks.

This generalized multiscale analysis methodology, which additionally has a low computational impact, allows arbitrary operators access to multiscale analysis. Hence, this is an advantage for real-time implementations of feature extraction, as for example in Internet/network traffic.

Multiscale values are analogous to their monoscale counterpart, but include an ability to search for information in/at different frames. This provides a vector that can be fed to appropriate machine learning approaches for detection phenomena of interest.

The scope of the claims should not be limited by the preferred embodiments set forth in the examples but should be given the broadest interpretation consistent with the specification as a whole.

The invention claimed is:

1. A method of feature extraction from a digital signal comprising:
   providing a plurality of samples of the digital signal;
   performing a plurality of iterations of steps including:
   a) segmenting the samples of the digital signal based on a grouping size to form a set of groupings each comprising a subset of the samples, wherein endpoints of each one of the groupings are spaced apart by the grouping size and the set of groupings collectively includes all of the samples; and
   b) applying a first operator, which is associated with a desired feature to be extracted, to the subsets of the samples to derive a plurality of representative values the set of groupings;
   wherein the first operator is adapted to correspond to the grouping size;
   wherein the grouping size of each iteration is different; and
   wherein, in step a) of at least one of the iterations, one of the endpoints of at least one of the groupings is intermediate the endpoints of another one of the groupings of the samples such that at least two of the groupings of the set of groupings overlap.

2. The method of claim 1 wherein, in each iteration, the subset of the samples in each one of the groupings consists of the endpoints of the respective one of the groupings.

3. The method of claim 1 wherein the grouping size of each subsequent one of the iterations is smaller than a preceding one of the iterations.

4. The method of claim 1 wherein the different grouping sizes of the iterations are related by a prescribed factor.

5. The method of claim 1 further comprising a step of applying a second operator to the representative values formed using the first operator for the set of groupings of each grouping size so as to derive compacted representative values, which are associated with the desired feature to be extracted, respectively for the different grouping sizes.

6. The method of claim 5 further comprising a step of applying a third operator to the compacted representative values formed using the second operator for the different grouping sizes so as to derive a further compacted representative value, which is associated with the desired feature to be extracted, for the samples.

7. The method of claim 1 wherein the iterations are performed until each one of the set of groupings shares a common endpoint with at least one other one of the groupings.

8. The method of claim 1 wherein, in step b), the first operator is applied to each subset of adjacent ones of the groupings.

* * * * *